United States Patent
Okamoto

(10) Patent No.: US 9,683,636 B2
(45) Date of Patent: Jun. 20, 2017

(54) RAVIGNEAUX PLANETARY GEAR DEVICE

(71) Applicant: Toyota Jidosha Kabushiki Kaisha, Toyota-shi (JP)

(72) Inventor: Daisuke Okamoto, Fujinomiya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/051,726

(22) Filed: Feb. 24, 2016

(65) Prior Publication Data

US 2016/0290471 A1 Oct. 6, 2016

(30) Foreign Application Priority Data

Mar. 30, 2015 (JP) ................................. 2015-069247

(51) Int. Cl.
*F16H 1/36* (2006.01)
*F16H 3/66* (2006.01)
*F16H 55/08* (2006.01)

(52) U.S. Cl.
CPC ............... *F16H 3/663* (2013.01); *F16H 1/36* (2013.01); *F16H 55/0873* (2013.01); *F16H 2200/202* (2013.01)

(58) Field of Classification Search
None
See application file for complete search history.

(56) References Cited

U.S. PATENT DOCUMENTS

| 5,346,443 A * | 9/1994 | Crysler ................. | F16H 48/285 475/248 |
| 5,728,024 A * | 3/1998 | Ishizuka ............... | F16H 48/285 475/252 |
| 7,654,929 B2 * | 2/2010 | Kimes ................... | F16H 57/082 475/331 |
| 8,113,088 B2 * | 2/2012 | Bawks ................... | F16H 48/11 475/249 |
| 2015/0082930 A1 | 3/2015 | Okamoto | |

FOREIGN PATENT DOCUMENTS

| JP | 2000-170882 | 6/2000 |
| JP | 2005-325966 | 11/2005 |
| JP | 2013-194802 | 9/2013 |

* cited by examiner

*Primary Examiner* — Dirk Wright
(74) *Attorney, Agent, or Firm* — Oblon, McClelland, Maier & Neustadt, L.L.P.

(57) ABSTRACT

A Ravigneaux planetary gear device includes a long pinion gear and a short pinion gear. A tooth of each of the long pinion gear and the short pinion gear has an end surface with curvature from an inner circumference side toward an outer circumference side of each of the long pinion gear and the short pinion gear and toward a center in a tooth width direction.

4 Claims, 4 Drawing Sheets

RAVIGNEAUX PLANETARY GEAR DEVICE

CROSS-REFERENCE TO RELATED APPLICATION(S)

The present application claims priority to and incorporates by reference the entire contents of Japanese Patent Application No. 2015-069247 filed in Japan on Mar. 30, 2015.

BACKGROUND OF THE INVENTION

1. Field of the Invention

The disclosure relates to a Ravigneaux planetary gear device used for an automatic transmission of a vehicle or the like.

2. Description of the Related Art

In the past, a Ravigneaux planetary gear device has been proposed such as one in which a front sun gear and a rear sun gear are arranged on a center axis and a long pinion gear and a short pinion gear are arranged between the sun gears and a ring gear provided concentrically with the respective sun gears (for example, refer to Japanese Patent Application Laid-open No. 2005-325966).

In the Ravigneaux planetary gear device, gears whose lengths are different from each other such as the long pinion gear and the short pinion gear are provided. Accordingly, an engagement point of the gears becomes offset, whereby a force of moment is generated in each of the pinion gears during rotation. Additionally, there is a case where the force of moment is not balanced and a rotation axis (supporting axis) of each of the pinion gears is inclined.

Here, an end surface of a tooth of the pinion gear in the Ravigneaux planetary gear device is usually subjected to chamfering processing. A corner portion is formed on a boundary between a section subjected to the chamfering processing (hereinafter, referred to as chamfered portion) and a section not subjected to the chamfering processing (hereinafter, referred to as flat portion). Accordingly, when the rotation axis of the pinion gear is inclined as described above, the corner portion of the end surface of the gear makes local contact with a contact surface of a peripheral member (e.g., a washer, or a bearing) arranged adjacent to the end surface of the gear.

At this time, when the aforementioned contact surface of the peripheral member has a high friction coefficient due to deterioration of lubrication state caused by, for example, an insufficient amount of lubricant oil, part of torque received by the contact surface acts on, as a reaction force of torque, respective tooth surfaces of the pinion gears and other gears. As a result, a surface pressure applied to the respective tooth surfaces is made larger, making a load loss increase.

SUMMARY OF THE INVENTION

It is an object of the present invention to at least partially solve the problems in the conventional technology.

In some embodiments, a Ravigneaux planetary gear device includes a long pinion gear and a short pinion gear. A tooth of each of the long pinion gear and the short pinion gear has an end surface with curvature from an inner circumference side toward an outer circumference side of each of the long pinion gear and the short pinion gear and toward a center in a tooth width direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A Ravigneaux planetary gear device according to an embodiment of the invention will be described with reference to FIGS. 1 to 4. The invention is not limited to the embodiment described below. In addition, components in the embodiment described below include components that can be replaced and easily replaced by those skilled in the art, or a substantially identical component.

Figure 1:
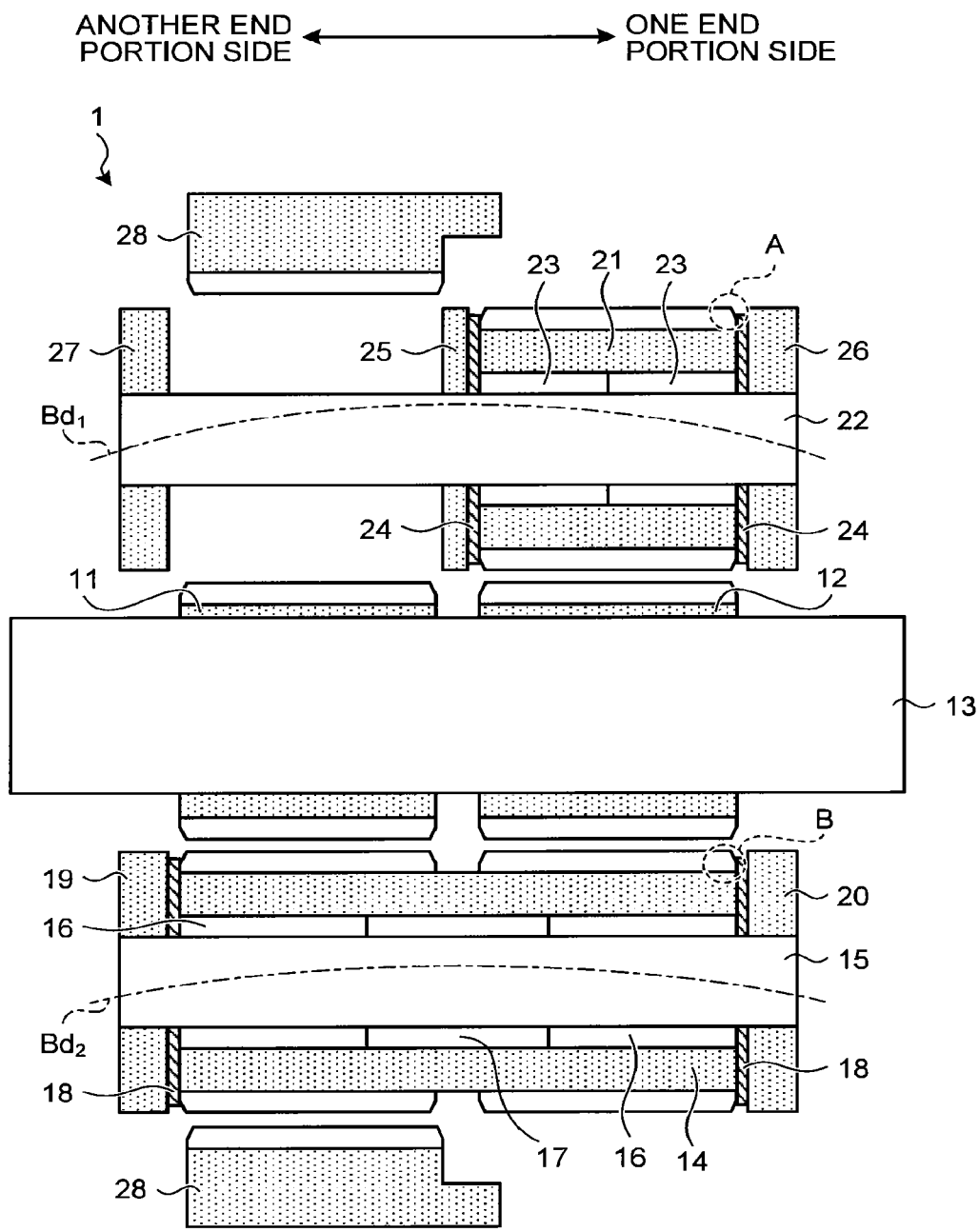
FIG. 1 is a cross-sectional view schematically illustrating an overall configuration of a Ravigneaux planetary gear device according to an embodiment of the invention.

The Ravigneaux planetary gear device 1 is used for a transmission of a vehicle or the like and, as illustrated in FIG. 1, includes a rear sun gear 11, a front sun gear 12, a center axis 13, a long pinion gear 14, a supporting axis 15, two bearing members 16, a spacer 17, two ring members 18, carriers 19 and 20, a short pinion gear 21, a supporting axis 22, two bearing members 23, two ring members 24, carriers 25, 26, and 27, and a ring gear 28. Note that FIG. 1 only illustrates configurations relating to the invention in a Ravigneaux planetary gear device 1 and other configurations are omitted in the drawings. Additionally, teeth of the respective gears are engaged with each other in the actual Ravigneaux planetary gear device 1. However, the teeth of the respective gears are illustrated as being separated for convenience of description.

The rear sun gear 11 and the front sun gear 12 are rotatably supported by the center axis 13. In addition, the rear sun gear 11 and the front sun gear 12 are provided at positions offset in an axial direction on the center axis 13. The long pinion gear 14 is provided in the periphery of the rear sun gear 11, while the long pinion gear 14 and the short pinion gear 21 are provided in the periphery of the front sun gear 12.

The long pinion gear 14 is rotatably supported by the supporting axis (rotation axis) 15 between the carrier 19 and the carrier 20. The two bearing members 16 and the spacer 17 are provided in the inside of the long pinion gear 14. The ring member 18 is provided between each of both ends of the long pinion gear 14 and each of the carriers 19 and 20. In addition, the bearing members 16, the spacer 17, and the ring members 18 are supported by the supporting axis 15 inserted therethrough. The bearing member 16 is, for example, a radial needle roller bearing, whereas the ring member 18 is a washer, a thrust needle roller bearing, or the like.

The short pinion gear 21 is rotatably supported by the supporting axis (rotation axis) 22 between the carrier 25 and the carrier 26. The supporting axis 22 has the same length as the supporting axis 15 of the long pinion gear 14. The two bearing members 23 are provided in the inside of the short pinion gear 21. The ring member 24 is provided between each of both ends of the short pinion gear 21 and each of the carriers 25 and 26. In addition, the bearing members 23 and the ring members 24 are supported by the supporting axis 22 inserted therethrough. The bearing member 23 is, for example, a radial needle roller bearing, whereas the ring member 24 is a washer, a thrust needle roller bearing, or the like.

Here, the short pinion gear 21 is arranged toward one end portion side of the supporting axis 22 in the axial direction. Specifically, the short pinion gear 21 is arranged between the center and the one end portion of the supporting axis 22 in the axial direction, while no member is arranged between the center and another end portion thereof in the axial direction to leave the space blank. The ring gear 28 is provided concentrically with the rear sun gear 11 and the front sun gear 12 and engaged with the long pinion gear 14.

Hereinafter, detailed configurations of the long pinion gear 14 and the short pinion gear 21 (hereinafter, summarily referred to as pinion gears 14 and 21 as necessary) according to the embodiment of the invention will be described. Note that, in the following description, a configuration according to a conventional technique will be described first for comparison and the configuration according to the embodiment of the invention will be then described.

Figure 2A:
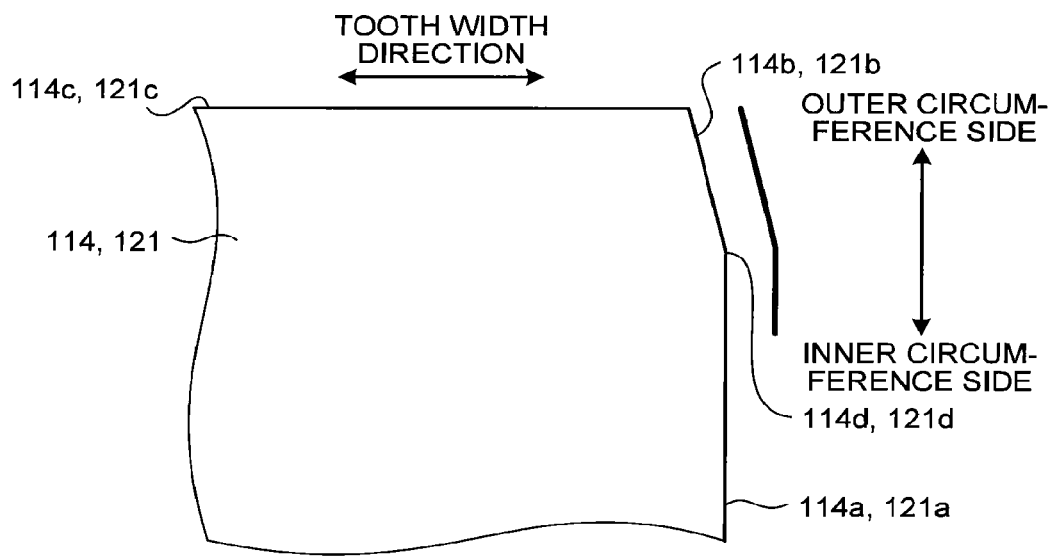
FIG. 2A is an enlarged view schematically illustrating an end surface of a tooth of a pinion gear in a conventional Ravigneaux planetary gear device.

A long pinion gear 114 and a short pinion gear 121 (hereinafter, summarily referred to as pinion gears 114 and 121 as necessary) of a conventional Ravigneaux planetary gear device has a configuration as illustrated in FIG. 2A. FIG. 2A is an enlarged view of the conventional Ravigneaux planetary gear device corresponding to section A and section B of the embodiment illustrated in FIG. 1.

End surfaces of teeth of the pinion gears 114 and 121 are subjected to chamfering processing. Specifically, the end surfaces of the teeth of the pinion gears 114 and 121 include flat portions 114a and 121a not subjected to the chamfering processing and chamfered portions 114b and 121b formed so as to be continuous to the flat portions 114a and 121a and connected to tooth edge surfaces 114c and 121c, respectively. The end surfaces of the teeth of the pinion gears 114 and 121 also include corner portions 114d and 121d formed on boundaries between the flat portions 114a and 121a and the chamfered portions 114b and 121b, respectively.

Here, the plurality of pinion gears having the same axial length and different widths is used in the Ravigneaux planetary gear device. Accordingly, when described using FIG. 1 as an example, motive power is transmitted while moving through positions in the axial direction such that motive power transmitted from the left side of the rear sun gear 11 is transmitted to the short pinion gear 21 through the long pinion gear 14 and then to the front sun gear 12. Therefore, a force of moment acts on the pinion gears 14 and 21 in the axial direction, causing the supporting axes 15 and 22 serving as rotation axes to be inclined during rotation of the gears in some cases.

Meanwhile, the Ravigneaux planetary gear device is considered that the force of moment does not act on the respective pinion gears in an ideal condition. For this reason, it has been assumed that the rotation axes of the respective pinion gears are inclined little because of the influence thereof and thus the Ravigneaux planetary gear device has not been designed taking such influence of the force of moment into account.

The inventors have produced a Ravigneaux planetary gear device in which thrust needle roller bearings are used as ring members (corresponding to the ring members 18 and 24 in FIG. 1) between the conventional pinion gears 114 and 121 as illustrated in FIG. 2A and carriers provided in the periphery thereof (corresponding to the carriers 19, 20, 25, and 26 in FIG. 1) to carry out driving experiment. In the results thereof, the inventors have found that significant sliding marks have been formed, due to friction, on entire circumferences of contact surfaces on both surfaces of a race of the thrust needle roller bearing, specifically, on both of a contact surface with each of the pinion gears 114 and 121 (one surface of the race) and a contact surface with a roller portion (another surface of the race).

Figure 2B:
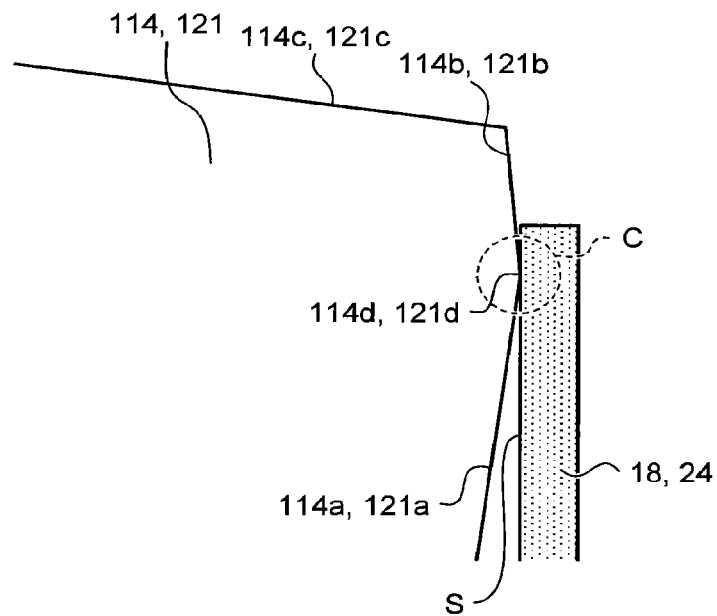
FIG. 2B is an enlarged view schematically illustrating the end surface of the tooth of the pinion gear being in contact with a contact surface of a peripheral member in the conventional Ravigneaux planetary gear device.

Here, in a case where, as in the conventional configuration, the corner portions 114d and 121d are formed on the end surfaces of the teeth of the pinion gears 114 and 121, respectively (refer to FIG. 2A), as illustrated in section C in FIG. 2B, the corner portions 114d and 121d each make contact with a contact surface S of each of the ring members 18 and 24 while the rotation axis is inclined. As a result, the corner portions 114d and 121d make local contact with the contact surfaces S of the ring members 18 and 24, respectively.

When such local contact occurs, compared to a case where the rotation axes of the pinion gears 114 and 121 rotate as originally designed to transmit motive power, a reaction force of a load generated as a result of the local contact (reaction force of torque) acts on a contact portion between the components constituting the Ravigneaux planetary gear device (for example, tooth surfaces between the pinion gears 114 and 121 and other gears). Consequently, a surface pressure generated on a sliding surface between the components constituting the Ravigneaux planetary gear device becomes larger and a load loss (e.g., a friction loss or an abrasion loss) thereby occurs.

The causes for the inclination of the rotation axis of the pinion gear include, in addition to a structural problem of the Ravigneaux planetary gear device derived from the plurality of pinion gears having different widths used therein as described above, factors such as deformation and bending of the components constituting the device, an assembling error during manufacturing of the device, variations in dimensions of the components constituting the device in manufacturing. Accordingly, the strength of the reaction force caused by the local contact, or a component or a section that receives the reaction force also vary depending on the degree of deformation and bending, the assembling error, and variations in dimensions of the components constituting the Ravigneaux planetary gear device. Additionally, when the tooth surfaces of the respective gears receive the reaction force caused by the local contact, the load loss occurs in the gears. When the roller portions of the radial needle roller bearings (bearing members 16 and 23) receive the reaction force, a bearing loss occurs.

Figure 3A:
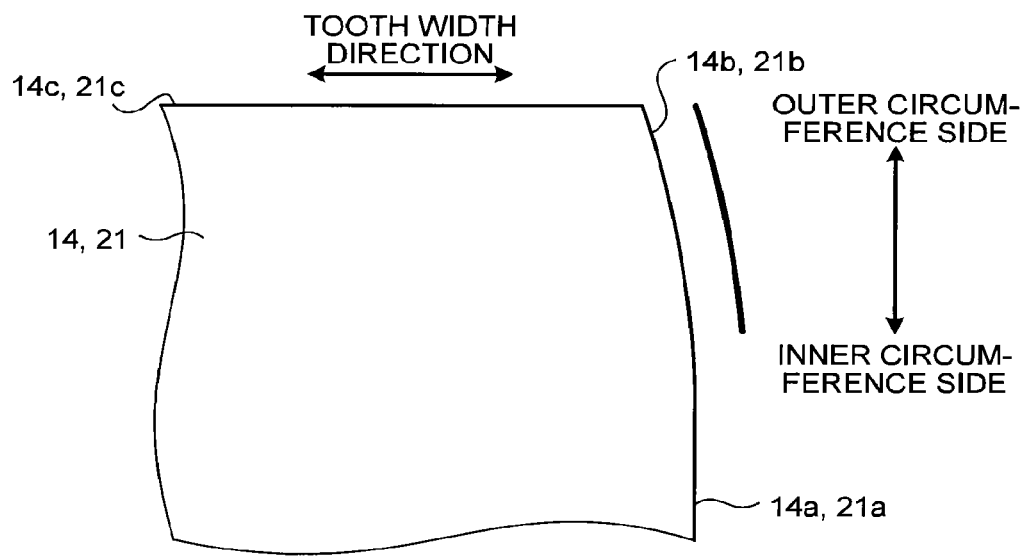
FIG. 3A is a partial enlarged view of section A and section B in FIG. 1 schematically illustrating an end surface of a tooth of a pinion gear in the Ravigneaux planetary gear device according to the embodiment.

In order to solve such a conventional problem, the pinion gears 14 and 21 of the Ravigneaux planetary gear device 1 according to the embodiment have a configuration as illustrated in FIG. 3A. FIG. 3A is an enlarged view of section A and section B of the embodiment illustrated in FIG. 1.

The pinion gears 14 and 21 are similar to the conventional pinion gears 114 and 121 in that the end surfaces of the teeth thereof are subjected to the chamfering processing. However, specific shapes of the end surfaces of the teeth are different from the conventional ones. Each of the teeth of the pinion gears 14 and 21 has the end surface with curvature from an inner circumference side toward an outer circumference side of each of the pinion gears 14 and 21 and toward the center in a tooth width direction. Specifically, the end surfaces of the teeth of the pinion gears 14 and 21 include flat portions 14a and 21a and curved surface portions 14b and 21b formed so as to be continuous to the flat portions 14a and 21a and connected to tooth edge surfaces 14c and 21c, respectively. Therefore, such corner portions 114d and 121d that the conventional pinion gears 114 and 121 have are not formed on the end surfaces of the teeth of the pinion gears 14 and 21 and boundaries between the flat portions 14a and 21a and the curved surface portions 14b and 21b, respectively, are smoothly formed.

Figure 3B:
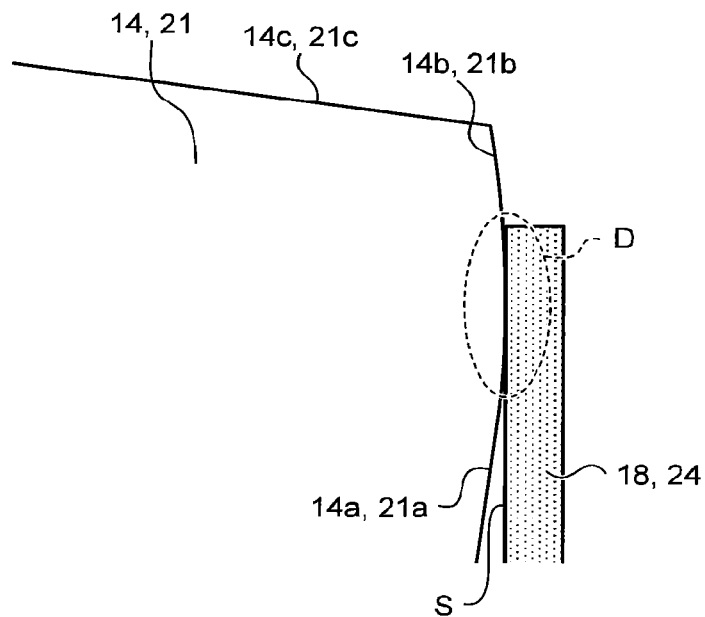
FIG. 3B is an enlarged view schematically illustrating the end surface of the tooth of the pinion gear being in contact with a contact surface of a peripheral member in the Ravigneaux planetary gear device according to the embodiment.

As described above, when each of the teeth of the pinion gears 14 and 21 has the end surface with the curvature, as illustrated in section D in FIG. 3B, an area in which the end surface of the tooth makes contact with the contact surface S of each of the ring members 18 and 24 while the rotation axis is inclined is enlarged such that the end surface of the tooth of each of the pinion gears 14 and 21 makes surface contact with the contact surface S of each of the ring members 18 and 24. Accordingly, such a local contact that occurs in the conventional configuration is prevented from occurring between the end surfaces of the teeth of the pinion gears 14 and 21 and the contact surfaces S of the ring members 18 and 24, respectively. As a result, an increase in the surface pressure generated on the sliding surface between the components constituting the Ravigneaux planetary gear device 1 (for example, between the tooth surfaces of the respective gears) is suppressed, thereby reducing the load loss.

Specific examples of the aforementioned contact surface S include a side surface of the washer, a side surface of the race of the thrust needle roller bearing (ring members 18 and 24), and the like. In the case of a Ravigneaux planetary gear device in which, for example, the ring members 18 are not provided between the pinion gear 14 and the carriers 19 and 20, while the ring members 24 are not provided between the pinion gear 21 and the carriers 25 and 26, the aforementioned contact surface S may be side surfaces of the respective carriers 19, 20, 25, and 26.

Here, the load loss between the gears can be expressed using the following formula (1) as disclosed in, for example, Reference Document (Japanese Patent Application Laid-open No. 2013-194802). In formula (1), W represents a load loss (friction loss), µ represents a friction coefficient, P represents a load acting on the contact surface between the respective gears, and ΔV represents a sliding velocity calculated from a difference between a velocity of one gear and a velocity of another gear.

$$W = \mu \Sigma P |\Delta V| \qquad (1)$$

As indicated by formula (1) described above, the friction loss W on the contact surface of the gear increases, as the load P acting on a contact line between the respective gears increases. Additionally, as described in aforementioned Reference Document, the friction coefficient µ on the contact surface of the gear decreases, as a length of the contact line between the respective gears increases. Accordingly, as illustrated in FIG. 3B, the surface pressure generated on the sliding surfaces (contact surfaces S) between the pinion gears 14 and 21 and the ring members 18 and 24, respectively, is reduced by an increase in the contact areas (the lengths of the contact lines), whereby, as indicated by formula (1) described above, the friction coefficient µ between the components is lowered while the load loss W is also reduced in accordance with that.

Figure 4:
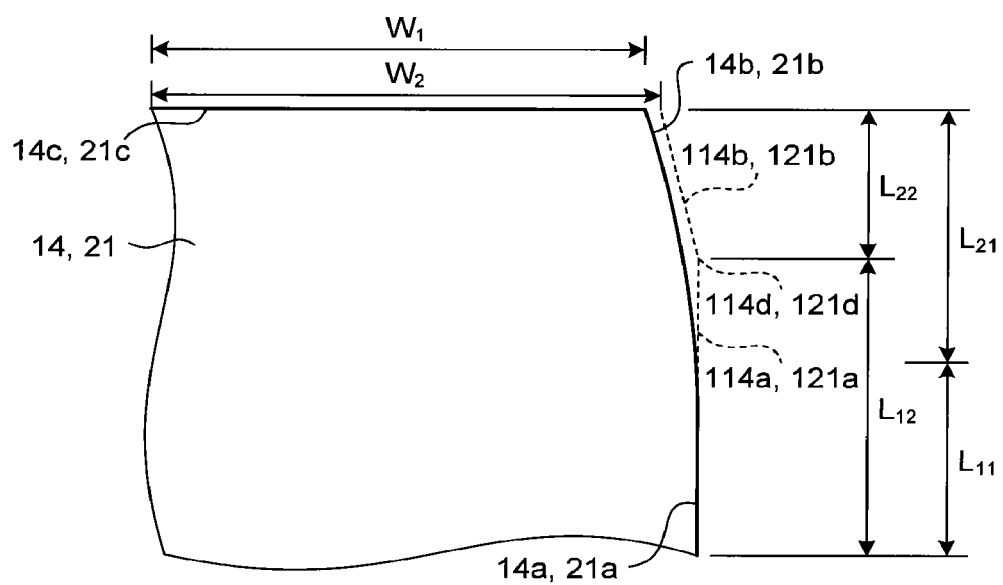
FIG. 4 is an enlarged view schematically illustrating the end surface of the tooth of the pinion gear in the Ravigneaux planetary gear device according to the embodiment compared with the end surface of the tooth of the pinion gear in the conventional Ravigneaux planetary gear device.

A comparison of the end surfaces between the pinion gears 14 and 21 according to the embodiment and the conventional pinion gears 114 and 121 is expressed by, for example, a relationship as illustrated in FIG. 4. In FIG. 4, a portion indicated by a dashed line represents a contour line of the end surface of the tooth of each of the pinion gears 114 and 121. As illustrated in FIG. 4, the pinion gears 14 and 21 are formed with the flat portions 14a and 21a each having a length $L_{11}$ shorter than a length $L_{12}$ of each of the conventional flat portions 114a and 121a. Accordingly, by this difference, a straight line length $L_{21}$ of each of the curved surface portions 14b and 21b is formed so as to be longer than a straight line length $L_{22}$ of each of the conventional chamfered portions 114b and 121b. Each of the pinion gears 14 and 21 is also formed such that a tooth width $W_1$ thereof is shorter than a conventional tooth width $W_2$.

As described earlier, in the past, the pinion gear has not been designed assuming that the rotation axis thereof is inclined as illustrated in FIG. 2B. Therefore, the importance of the flatness of the flat portions 114a and 121a has been highly emphasized on the end surfaces of the teeth of the pinion gears 114 and 121 and it has been considered ideal to allow the flat portions 114a and 121a to make contact with the contact surfaces S of the ring members (corresponding to the ring members 18 and 24 in FIG. 1) as flatly as possible. On the other hand, such a conventional idea has been removed from the Ravigneaux planetary gear device 1 according to the embodiment to form the curvature on the end surfaces of the teeth of the pinion gears 14 and 21.

Specifically, the curvature of the curved surface portions 14b and 21b provided on the end surfaces of the teeth of the pinion gears 14 and 21 is set to values in accordance with inclined amounts of the supporting axes 15 and 22 during rotation of the long pinion gear 14 and the short pinion gear 21. In other words, it is preferable that the optimum values for the curvature of the curved surface portions 14b and 21b be experimentally obtained in advance depending on, for example, the inclined amounts of the supporting axes 15 and 22 to set the curvature depending on actual inclined amounts. As described thus far, by setting the proper curvature on the end surfaces of the teeth of the pinion gears 14 and 21, the increase in the surface pressure between the components can be effectively suppressed and the load loss can be further reduced.

Here, as disclosed in Japanese Patent Application Laid-open No. 2005-325966 mentioned earlier, it is known that the supporting axis 15 of the long pinion gear 14 and the supporting axis 22 of the short pinion gear 21 bend during rotation. However, amounts of bending for the respective supporting axes 15 and 22 are not the same. Specifically, as illustrated in FIG. 1, the supporting axis 15 of the long pinion gear 14 and the supporting axis 22 of the short pinion gear 21 both have the axial lengths similar to each other. However, the short pinion gear 21 is arranged toward the one end portion side of the supporting axis 22 in the axial direction and thus the width of the gear is small relative to the axis. For this reason, the amount of bending of the supporting axis 22 increases.

Accordingly, as illustrated in FIG. 1, the amount of bending $Bd_1$ of the supporting axis 22 of the short pinion gear 21 during rotation becomes larger than the amount of bending $Bd_2$ of the supporting axis 15 of the long pinion gear 14. The supporting axis 22 is therefore inclined more largely than the supporting axis 15. As a result, compared to the long pinion gear 14, the short pinion gear 21 makes hard contact with the contact surfaces S of the ring member 24 (refer to FIG. 3B), which causes the reaction force of torque acting on the short pinion gear 21 to become larger. Note that the amount of bending $Bd_1$ and the amount of bending $Bd_2$ illustrated in FIG. 1 are exaggerated for description and differ from actual amounts of bending.

Therefore, it is preferable that the curvature provided on the end surface of the tooth of the short pinion gear 21 be larger than the curvature provided on the end surface of the tooth of the long pinion gear 14. As described above, among the curvature provided in the teeth of the two types of pinion gears 14 and 21, namely, the large one and the small one, the curvature of the short pinion gear 21 whose rotation axis is inclined more largely is made larger to thereby suppress the increase in the surface pressure between the components effectively and reduce the load loss further.

Additionally, the short pinion gear 21 is arranged toward the one end portion side of the supporting axis 22 in the axial direction. Accordingly, the end surfaces of the tooth of the short pinion gear 21 receive a larger reaction force of torque from the contact surface S of the ring member 24 provided on the one end portion side (that is, the right side in FIG. 1) of the supporting axis 22 in the axial direction than a reaction force of torque received from the contact surface S of the ring member 24 provided on the another end portion side (that is, the left side in FIG. 1) of the supporting axis 22 in the axial direction.

Therefore, it is preferable that, among the curvature provided on the end surfaces of the tooth of the short pinion gear 21, the curvature of the curved surface portion 21b provided on the end surface on the one end portion side of the supporting axis 22 in the axial direction be larger than the curvature of the curved surface portion 21b provided on the end surface on the another end portion side of the supporting axis 22 in the axial direction. As described above, among the curvature provided on the two end surfaces of the tooth of the short pinion gear 21, the curvature on a side of the larger reaction force of torque received from the contact surface S of the peripheral member is made larger to thereby suppress the increase in the surface pressure between the components effectively and reduce the load loss further.

In the Ravigneaux planetary gear device 1 having the configuration described thus far, the end surfaces of the teeth of the pinion gears 14 and 21 are provided with the curvature such that regions thereof with which the contact surfaces S of the peripheral members (for example, the ring members 18 and 24) make contact are smoothly slanted. As a result, the contact areas between the end surfaces of the teeth of the pinion gears 14 and 21 and the contact surfaces S of the peripheral members are enlarged, whereby the local contact is prevented from occurring. Consequently, in the Ravigneaux planetary gear device 1, the reaction force of torque applied between the components is reduced and the surface pressure due to the reaction force of torque is thus made smaller between the tooth surfaces, whereby the load loss between the components is reduced.

In some embodiments, among the curvature provided in the teeth of the two types of pinion gears, namely, the large one and the small one, the curvature of the short pinion gear whose rotation axis is inclined more largely is made larger to thereby suppress an increase in the surface pressure between the components effectively and reduce the load loss further.

In some embodiments, the curvature is properly set depending on inclined amounts of the rotation axes of the short pinion gear and the long pinion gear, whereby the increase in the surface pressure between the components can be effectively suppressed and the load loss can be further reduced.

The Ravigneaux planetary gear device can reduce the reaction force of torque applied between the tooth surfaces of the gears and suppress the increase in the surface pressure between the tooth surfaces. As a result, the load loss between the components can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A Ravigneaux planetary gear device comprising a long pinion gear and a short pinion gear, wherein
   a tooth of each of the long pinion gear and the short pinion gear has an end surface with curvature from an inner circumference side toward an outer circumference side of each of the long pinion gear and the short pinion gear and toward a center in a tooth width direction.

2. The Ravigneaux planetary gear device according to claim 1, wherein
   the curvature of the end surface of the tooth of the short pinion gear is larger than the curvature of the end surface of the tooth of the long pinion gear.

3. The Ravigneaux planetary gear device according to claim 1, wherein
   the curvature of the end surface of the tooth of each of the long pinion gear and the short pinion gear is set to a value in accordance with an inclined amount of a rotation axis of each of the long pinion gear and the short pinion gear during a rotation of each of the long pinion gear and the short pinion gear.

4. The Ravigneaux planetary gear device according to claim 2, wherein
   the curvature of the end surface of the tooth of each of the long pinion gear and the short pinion gear is set to a value in accordance with an inclined amount of a rotation axis of each of the long pinion gear and the short pinion gear during a rotation of each of the long pinion gear and the short pinion gear.

* * * * *